United States Patent [19]

Blanke

[11] 4,164,142
[45] Aug. 14, 1979

[54] METHOD FOR SETTING SIDE TO SIDE CARBURETOR BALANCE

[75] Inventor: John D. Blanke, Fullerton, Calif.

[73] Assignee: Beckman Instruments, Inc., Fullerton, Calif.

[21] Appl. No.: 904,106

[22] Filed: May 8, 1978

Related U.S. Application Data

[62] Division of Ser. No. 824,897, Aug. 15, 1977, Pat. No. 4,116,053.

[51] Int. Cl.² ............................................ G01M 19/00
[52] U.S. Cl. .................................................... 73/118
[58] Field of Search .................................. 73/116, 118

[56] References Cited

U.S. PATENT DOCUMENTS

| 3,757,572 | 9/1973 | Gower et al. | 73/116 |
| 3,921,454 | 11/1975 | Reames | 73/118 |

*Primary Examiner*—Herbert Goldstein
*Attorney, Agent, or Firm*—Robert J. Steinmeyer; Paul R. Harder; Frank J. Kowalski

[57] ABSTRACT

The present invention pertains to a method for setting the side to side balance of a multi-barreled carburetor on an automobile engine which is running smoothly with no misfiring cylinders and which is set to factory specifications for curb idle speed and timing.

2 Claims, 2 Drawing Figures

METHOD FOR SETTING SIDE TO SIDE CARBURETOR BALANCE

This application is a division of application Ser. No. 824,897, filed Aug. 15, 1977, issued Oct. 3, 1978 as U.S. Pat. No. 4,116,053.

BACKGROUND OF THE INVENTION

Control of emissions from motor vehicles is now an accepted and necessary automotive design consideration throughout the world. In the United States since about 1965 (and earlier in California) all motor vehicles sold have incorporated some form of emission control. Recently, more vehicles sold for use in countries other than the United States have also been designed to reduce pollutants. The speed with which engine design changes have taken place to satisfy pollution reduction requirements has been extraordinary. Not only have the engine and vehicle manufacturers had to engage in major expenditures for facilities, equipment, and accelerated technical achievement, but similarly, the automotive service industry has been experiencing a major upheaval in the effort to provide continuing emission control apparatus malfunction diagnosis and maintenance capability.

The stringent standards in the United States for 1975 have forced most automobile manufacturers to use catalytic converters on current production vehicles to provide adequate control of exhaust emissions of hydrocarbons (HC) and carbon monoxide (CO). When the catalytic converter is functioning properly, it oxidizes essentially all of the HC and CO to carbon dioxide ($CO_2$) and water vapor ($H_2O$). Oxygen ($O_2$) concentrations and the source of $O_2$ in the exhaust gas (i.e., from secondary air pumps or through modulated air bleeds to the induction system) necessary for the proper operation of the catalytic converter will become an important control and adjustment parameter in the design as well as in the proper servicing of vehicles in subsequent years. The service mechanic will be required to make precise adjustment of air control devices based upon exhaust concentrations of $O_2$. Of course, the measurement of HC and CO will continue to be important tools as well, in the complete diagnosis of engines and emission control systems.

In the patent to J. D. Blanke and N. E. Brunell (U.S. Pat. No. 4,030,349) entitled ENGINE ANALYSIS APPARATUS and the patent to J. D. Blanke (U.S. Pat. No. 4,031,747) entitled MISFIRE MONITOR FOR ENGINE ANALYSIS HAVING AUTOMATIC RESCALING, assigned to the common assignee of this application, apparatus and methods are disclosed wherein the rate of change of $O_2$ at the tailpipe with respect to time is used to properly adjust the carburetor settings of the engine so as to prevent a lean roll condition which would otherwise act to lower engine efficiency and raise pollutant output. Thus, it can be seen that the monitoring of oxygen content in the exhaust gases of automobiles is rapidly becoming an important diagnostic consideration.

Catalytic converters must operate at relatively high temperatures (450° to 700° C.) to accomplish efficient conversion of HC and CO to $CO_2$ and $H_2O$. Through 1977 all catalytic converter equipped vehicles have utilized oxidizing catalysts (rather than reduction catalysts) which require free $O_2$ to function. The catalyst, which may be either in the pellet or monolithic form, is usually a substrate of alumina or similar material coated with a small amount of platinum and/or palladium. The noble metal catalyzes an oxidation reaction in the presence of HC, CO and $O_2$ to accomplish conversion to non-toxic products of complete combustion. The reactions are:

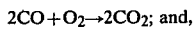

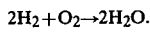

If there is not enough $O_2$ available, conversion efficiency suffers and, if there is an excess of $O_2$ available, the catalyst assists in the conversion of gasoline sulfur to undesirable $SO_3$ which ultimately forms $H_2SO_4$ and other sulfates. The problem of the production of $H_2SO_4$ by catalytic converter equipped automobiles is one of concern presently under study.

It is possible for the surface of the catalyst, wherein the above described catalytic reaction takes place, to become poisoned by metals such as lead which may be contained in the exhaust gases. As the catalyst becomes poisoned, the chemical activity of the catalyst becomes reduced. As the amount of chemical activity becomes less than that required for total reaction of the products in the exhaust stream, only a portion of the desired reaction can take place. The portion of the reaction taking place as compared to the total reaction which could take place in an unpoisoned catalytic converter is a measure of efficiency of the catalytic converter. That is, if only 50% of the reaction is taking place which would take place with an unpoisoned catalytic converter of the same configuration, the catalytic converter in question is 50% efficient. Since the engine is injecting air containing $O_2$ into the exhaust stream in a quantity needed to oxidize the CO and HC's for high efficiency, with less than 100% efficiency the balance of the $O_2$ will be passed through as free $O_2$. Obviously, the HC and CO content of the exhaust gases as emitted into the atmosphere will also rise.

At such time as the efficiency of the catalytic converter drops below a minimum acceptable level, appropriate action needs to be taken in order to obtain the clean air benefits to the populus for which the catalytic converter was originally incorporated into the automobile. Either the catalytic converter should be replaced or, alternatively, it should be rejuvenated such as by the technique described in the copending application Ser No. 820,481 issued as U.S. Pat. No. 4,116,053 to R. M. Neti and K. B. Sawa for CATALYTIC REACTOR SYSTEMS METHOD AND APPARATUS, also assigned to the common assignee of the present application.

As with other forms of automobile exhaust emission testing any technique and apparatus for testing catalytic converter efficiency must be inexpensive, convenient, and rapid if it is going to be of practical value. Components of the exhaust system of an automobile are typically quite hot when presented to a service garage for analysis since the automobile is normally driven to the garage or tested following a tuneup as opposed to being tested in the owner's garage after a period of non-operation. Likewise, components of the automotive exhaust system are prone to rusting and the accompanying seizing of nuts and bolts used for assembly due to the action of the high temperatures in conjunction with the moisture in the exhaust, air, and from the road surfaces which tends to remove any protective coatings thereon and stimulate the oxidation of the ferrous materials from which the exhaust component housings are normally manufactured. Similar problems of heat and rusting were encountered when sampling ports for the insertion of gas sampling apparatus were installed in exhaust systems. Such sampling ports are, therefore, no longer included in automotive exhaust systems as manufactured. Consequently, any testing of the efficiency of a catalytic converter must be accomplished on the car, without removal therefrom, in the presence of components too hot to handle and without the benefit of a sampling port. Thus, what is needed is a technique for analyzing the efficiency of a catalytic converter equipped exhaust system wherein the only contact with the exhaust system itself is through a probe or sampling device inserted into the tailpipe to sample the quantity of one or more components of the gas stream.

Wherefore, it is the object of the present invention to provide a method for determining the efficiency of a catalytic converter equipped automotive exhaust system in situ which is rapid, accurate, simple, inexpensive, and convenient.

SUMMARY

The foregoing objectives have been met by the present invention wherein a family of working curves graphing the conversion efficiency of the exhaust system in percent against the carbon monoxide at the tailpipe in percent as a function of the various oxygen dilution levels to be found in the exhaust gases is used in conjunction with a test procedure wherein: the engine air injection system is disabled as by disconnecting the vacuum line from the actuator valve controlling the engine air pump or the like. The carbon monoxide and hydrocarbon emissions are read to verify the engine is running properly at a curb idle speed. The carburetor is then adjusted to fix the tailpipe oxygen level at approximately 1%. If necessary, both idle mixture screws are adjusted to attain proper side to side balance of the carburetor. The injection of air into the exhaust stream is then re-established. This should cause the tailpipe oxygen to rise to somewhere between 6 and 11%. The attained oxygen level is read and noted. The value is used to select the proper oxygen dilution level curve from the previously described family of curves on the conversion efficiency v. tailpipe carbon monoxide graph. The air injector system is once again disabled which should cause the tailpipe oxygen to drop again to approximately 1%. A source of extra hydrocarbon is then added to the fuel stream to consume the free oxygen and thereby disable operation of the catalytic converter. In the preferred embodiment, this is effected by injecting bottled propane into the air cleaner inlet. The propane flow is adjusted so that the carbon monoxide content at the tailpipe being monitored reads 2%±0.1%. While maintaining the flow of propane, the air injection system is once again activated to cause air to be injected into the exhaust system. The carbon monoxide level is again read. The dilution factor corrected efficiency is then taken from the graph using the previously established oxygen dilution line from the family of curves corresponding to the oxygen value at the tailpipe with air injection in conjunction with the last ascertained value of carbon monoxide at the tailpipe.

DESCRIPTION OF THE PREFERRED EMBODIMENT

The present invention provides a simple procedure that can be used to isolate questionable catalytic converters. The approach involves using the engine as a feed gas supplier to the catalytic converter. The engine supplies a constant flow of heat and exhaust gas while the operator externally controls the carbon monoxide and oxygen level being received by the converter. It should be noted initially that the test results are an indication of the efficiency of the total exhaust system in its job of removing undesirable hydrocarbons and carbon monoxide. That is, the hot metal of the exhaust system prior to the catalytic converter acts, along with the excess oxygen being injected into the exhaust system to furnish oxygen for the catalytic converter, as a thermal reactor which, itself, removes some of the undesirable constituents of the exhaust gas. The procedure shown amounts virtually to a catalytic converter efficiency check if thermal conversion prior to the reactor is low. However, it is to be remembered that the goal of emission control is to lower the tailpipe emissions regardless of which devices on the vehicle accomplish it. The dilution factor corrected efficiency testing method to be described hereinafter is a viable approach toward meeting these ends.

In order to properly understand the description that follows, it is important to be aware that the addition of injected air into the exhaust manifold of an automotive engine has three effects on the CO and HC levels in the exhaust gases.

a. Dilution occurs and lowers the CO and HC's by the dilution factor $$\frac{\text{Injected Air Volume}}{\text{Total Exhaust Volume}}.$$

For example, if the injected air volume is one half the total exhaust volume, the dilution factor is 0.50. If CO is 2.0% before air injection, it will be 1.0% at the tailpipe when the air injection system is connected.

b. Thermal oxidation occurs in the exhaust manifold and lowers the diluted CO and HC concentrations even further.

c. Catalytic oxidation occurs in the converter and lowers the CO and HC concentrations to their final level.

Figure 1:
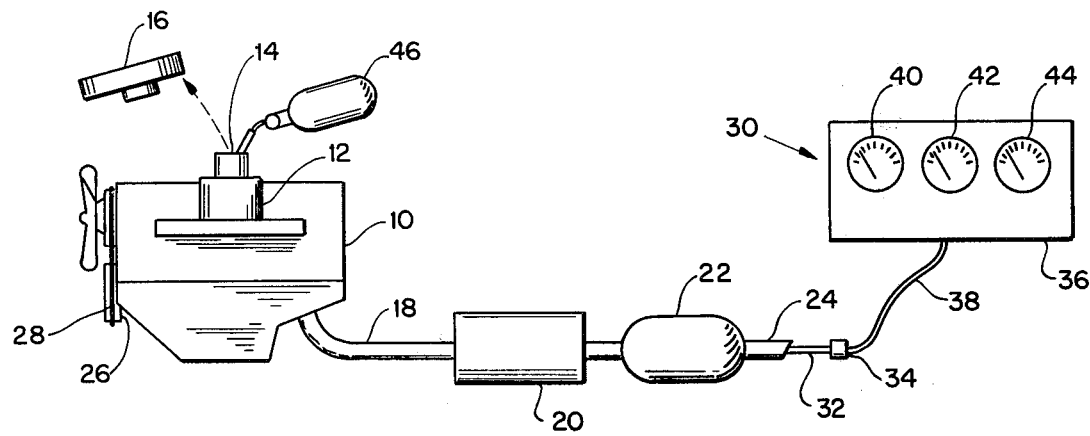
FIG. 1 is a simplified drawing of an automotive type engine and its exhaust components along with the apparatus needed for accomplishing the efficiency testing procedure according to the present invention.

Referring now to FIG. 1, an engine 10 is shown having a carburetor 12 producing an air/fuel mixture for the engine which includes an air intake throat 14 upon which an air cleaner 16 is adapted to be mounted. It is to be noted that the method of the present invention will work equally well on a fuel-injected engine. The engine 10 has an exhaust pipe 18 having a catalytic converter 20 in line therewith followed by a muffler 22 and terminating in a tailpipe 24. Typically, in such an engine, an air pump 26 is driven by the fan belt 28 to provide an auxiliary source of air under pressure to the engine. The air from the air pump 26 is connected through an actuator valve (not shown) to supply air along with the exhaust gases entering exhaust pipe 18. The air from air pump 26 mixed with the exhaust gases entering catalytic converter 20 provides a source of oxygen to be used by catalytic converter 20 in converting the unburned hydrocarbon and carbon monoxide to carbon dioxide and water vapor. Other methods for supplying air to the exhaust gas stream may be employed. The actual method of air injection forms no part of the present invention. Where air injection disablement or actuation is called for, appropriate means should be taken in light of the apparatus employed in the engine under test using the method of the present invention.

To practice the method of the present invention according to the preferred embodiment thereof, testing apparatus generally indicated as 30 must be utilized. Testing apparatus 30 employs a probe 32 adapted to be inserted into the exhaust pipe 24 to sample the exhaust gases emitted therefrom. Suitable sensing means 34 are associated with probe 32 to detect components in the exhaust gases. Sensing means 34 are connected to a display panel 36 with connecting cable 38. Display panel 36 contains appropriate electronics to respond to the signals being developed by sensing means 34 and display on meters 40, 42 and 44 the quantity of hydrocarbons (HC), carbon monoxide (CO), and oxygen ($O_2$), respectively being sensed by sensing means 34.

Figure 2:
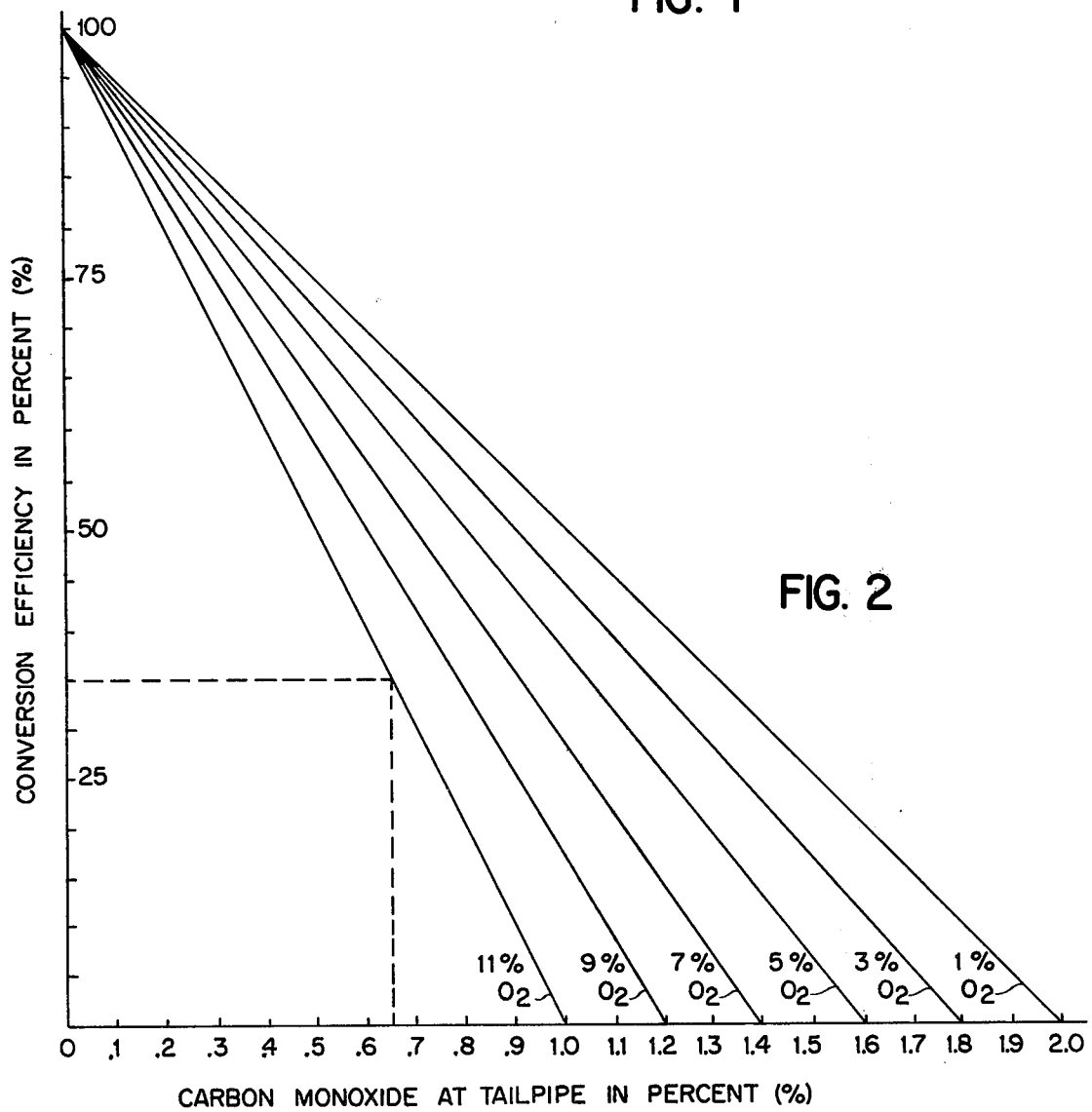
FIG. 2 is a graph of conversion efficiency in percent v. carbon monoxide at the tailpipe in percent for a family of curves representing oxygen dilution factors of 1% through 11%.

Referring now to FIG. 2, a family of curves for various oxygen dilution levels are shown graphing the conversion efficiency of the exhaust system in percent v. the carbon monoxide level at the tailpipe in percent. While mathematically the graphing is referred to as a family of curves, in actuality, the lines labeled 1% $O_2$ through 11% $O_2$ are straight lines. That is, it was found that for a given level of oxygen at the exhaust pipe the conversion efficiency of the exhaust system as a function of carbon monoxide at the tailpipe could be graphed as a straight line. Thus, the graph of FIG. 2 necessary to practice the method of the present invention comprises a family of straight lines each representing conversion efficiency as a function of tailpipe emission carbon monoxide content. It is well known that two points are required to determine a straight line. The point (100% efficient, 0% CO) is common to all the lines of FIG. 2. That is, when all of the CO has been removed from the exhaust gases exiting the tailpipe, the catalytic converter is 100% efficient, by definition, regardless of the $O_2$% level. The second point for any $O_2$% line can be determined by a functional relationship between $O_2$% and CO% for 0% efficiency. At 0% efficiency, $CO\% = (21 - O_2\%)/10$. Thus, for any given tailpipe $O_2$% level, the second point to fix the straight line of efficiency v. CO is $(O, (21 - O_2\%)/10)$. By inspecting the graph of FIG. 2 it can also be seen that starting at the point (0% efficiency, 2.0% CO) the CO% level at 0% efficiency decreases linearly 0.1% for each 1% increase in $O_2$% level. This relationship, of course, can be put to good use in interpolating for higher accuracy or to add additional lines. Other lines can, therefore, be graphed onto the chart as necessary by interpolating between the values given and drawing the appropriate straight line. Thus, for example, should the exhaust pipe oxygen level be found to be a value of 15% (which is not likely in presently known engines) since CO decreases by 0.1% for each 1% increase in $O_2$ the appropriate line could be added to the graph of FIG. 2 by drawing a straight line connecting the point representing 0% efficiency and 0.6% carbon monoxide with the point representing 0% carbon monoxide and 100% efficiency.

In using the graph of FIG. 2, the carbon monoxide percent level is the measured variable and the conversion efficiency is to be determined. Thus, as shown by the dotted line, if the 11% $O_2$ line were established as the proper oxygen dilution line to be employed in the procedure to be hereinafter discussed, then, if the carbon monoxide were determined to be at a 0.65% level, one can see by following the dotted line to where it meets the 11% $O_2$ line and thence horizontally to the corresponding position of the conversion efficiency axis, that at 11% $O_2$ a tailpipe carbon monoxide level of 0.65% indicates a conversion efficiency of 35%. Using the same technique, one can verify that when using the 5% $O_2$ line, 1% carbon monoxide is indicative of slightly over 40% conversion efficiency.

The procedure to be followed according to the method of the preferred embodiment is as follows:

1. Disable the air injection system. Depending on the system employed, this may involve disabling the air pump by disconnecting the vacuum line from the actuator valve or disconnecting the air pump or air bleed lines from the exhaust manifold.

2. Read CO and HC emissions to verify the engine is running properly and at curb idle speed.

3. Adjust the carburetor so that the tailpipe oxygen is at 1% ± 0.2%. Do this adjustment by adjusting both idle mixture screws equally in order to maintain good side to side balance.

4. Reactivate the air injection system. This should cause the tailpipe oxygen to be between 6 and 11%.

5. Read and note the oxygen level in the tailpipe. This value includes the dilution oxygen and should then be used to select the proper $O_2$% line on the conversion efficiency v. tailpipe CO graph of FIG. 2.

6. Disable the air injection system.

7. Verify that the oxygen level at the tailpipe drops to 1% ± 0.2%.

8. Inject propane into the air cleaner inlet or carburetor throat and adjust the flow of propane so that the CO meter reads 2% ± 0.1%.

9. Reactivate the air injection system.

10. Read the CO value.

11. With this CO value, find the dilution factor corrected efficiency by using the $O_2$% line selected in step 5 according to the technique previously described hereinbefore.

12. Determine by using factory specifications if efficiency level is adequate.

Step 8 of the foregoing procedure requires that propane be injected into the carburetor inlet. This can most easily be accomplished using the technique shown in FIG. 1. Either the air cleaner 16 can be removed from carburetor 12 or, on models so equipped, the propane can be injected directly into the "horn" of the air cleaner. In either case, the unignited nozzle of a bottled propane torch 46 is inserted to supply propane. Torch 46 is of the type wherein a valve and nozzle fitting is screwed onto a bottle of liquefied propane gas. In larger test installations, of course, the propane gas could be supplied from a hose connected to a remote supply. Likewise, other sources of appropriate fuel could be employed as desired. The propane (fuel injection itself serves two important functions in the procedure.

a. It enriches the mixture without affecting the basic carburetor settings.

b. It overfuels the engine and catalytic converter, thereby oxygen starving the converter and minimizing any catalytic conversion action.

Other considerations relative to the foregoing procedure are:

1. The engine must be running smoothly in order to get a steady exhaust flow and steady emission level. This ensures that the only changes in feed gas to the converter are those done externally to the system.

2. The unair injected engine is set at 1%±0.2% oxygen at the tailpipe to ensure it is more lean than stoichiometric. This ensures that the CO level is low. The low CO level is important so that when the air injection system is connected, only a low percentage of the excess $O_2$ is used in the thermal reactor and catalytic converter to oxidize the CO.

3. With the catalytic converter running oxygen starved, it is virtually nonactive and the emission levels are the same before and after the catalyst. This technique eliminates the need for a tap ahead of the converter which would be required by any other method.

TEST DATA

The following test data was generated using a late model mid-sized automobile with a 302 cubic inch displacement eight cylinder engine. This vehicle was a rental vehicle with 14,500 accumulated miles. Prior to any emission testing, the vehicle was tested using a commercial diagnostic tester. Road conditions were simulated, using the diagnostic tester. Engine condition at both idle and 30 mph cruise conditions were analyzed. The vehicle was found to be running well at these two conditions and was within factory tune up specifications. To gather the data, three separate converters were used. One was brand new, one had no catalyst material inside and the third was the as received converter on the car with 14,500 miles accumulated usage.

In interpreting the data and conclusions drawn therefrom it is important to remember that the addition of the injected air has the three effects on the CO and HC levels in the exhaust gases previously mentioned.

First, dilution occurs and lowers the CO and HC's by the dilution factor $$\frac{\text{Injected Air Volume}}{\text{Total Exhaust Volume}}.$$

Next, thermal oxidation occurs in the exhaust manifold and lowers the diluted CO and HC concentrations even further.

Finally, catalytic oxidation occurs in the converter and lowers the CO and HC concentrations to their final level.

To properly assess the conversion efficiencies of the various emission control devices as a check on the method of the present invention, a sampling port was welded ahead of the converter. Two separate Nondispersive Infrared (NDIR) type CO and HC analyzers were used. They were gas calibrated and cross correlated using both known content span gases and auto exhaust gases. A system leak test was done by comparing prereactor oxygen (<0.5%) with after reactor oxygen on the nonworking converter. Any leaks in the tailpipe or the NDIR sampling systems would have shown up on the oxygen analyzer.

Data for each of the three converters was taken under the following conditions:

a. Air injection disconnected and no propane injected.
b. Air injection disconnected and propane injected.
c. Air injection connected and propane injected.

For the nonworking converter data was also taken under the following conditions:

a. Air injection connected and no propane injected. (This condition established the oxygen level data needed to compute the dilution factor.)

The preconverter and after converter data is as follows:

| | PRECONVERTER EXHAUST GAS CONCENTRATIONS | | | |
|---|---|---|---|---|
| | Air Injection Off Propane Off | Air Injection Off Propane On | Air Injection On Propane Off | Air Injection On Propane On |
| CO | | | | |
| A. No Converter | .8% | 2.0% | .4% | .5% |
| B. New Converter | .7% | 1.7% | — | .7% |
| C. Test Converter | .7% | 1.7% | — | .5% |
| HC | | | | |
| A. No Converter | 150 ppm | 150 ppm | 90 ppm | 80 ppm |
| B. New Converter | 150 ppm | 150 ppm | — | 60 ppm |
| C. Test Converter | 130 ppm | 120 ppm | — | 60 ppm |
| $O_2$ | | | | |
| A. No Converter | 1.25% | .4% | 8%* | 7.5% |
| B. New Converter | 1.25% | .2% | — | 7.5% |
| C. Test Converter | 1.25% | .5% | — | 7.5% |

*(.65 dilution factor)

| | AFTER CONVERTER EXHAUST GAS CONCENTRATIONS | | | |
|---|---|---|---|---|
| | Air Injection Off Propane Off | Air Injection Off Propane On | Air Injection On Propane Off | Air Injection On Propane On |
| CO | | | | |
| A. No Converter | .8% | 2.0% | .4% | .5% |
| B. New Converter | .05% | 1.7% | — | .05% |
| C. Test Converter | .15% | 1.6% | — | .05% |
| HC | | | | |
| A. No Converter | 150 ppm | 150 ppm | 90 ppm | 80 ppm |
| B. New Converter | 40 ppm | 150 ppm | — | 30 ppm |
| C. Test Converter | 90 ppm | 140 ppm | — | 60 ppm |

| AFTER CONVERTER EXHAUST GAS CONCENTRATIONS -continued | | | | |
|---|---|---|---|---|
| | Air Injection Off Propane Off | Air Injection Off Propane On | Air Injection On Propane Off | Air Injection On Propane On |
| $O_2$ | | | | |
| A. No Converter | 1.25% | .2% | 8%* | 7.5% |
| B. New Converter | .75% | .2% | — | 7.5% |
| C. Test Converter | 1.25% | .75% | — | 7.5% |

*(.65 dilution factor)

In analyzing the foregoing data, the following are of particular significance:

a. As desired, the converter is virtually inoperative with the propane enrichment and air injection off. CO and HC concentrations are essentially the same before and after the converter for all three converters tested.

b. Simple dilution does not account for the drop in the preconverter CO and HC concentrations when both air injection and propane are on. With dilution considered, both should drop only 35%. Both dropped more than this (CO 75% and HC 47%) on the "No Converter" testing. This confirms the thermal reactor effect of the preconverter exhaust components.

Four different efficiencies were calculated to verify the method of the present invention. They are:

A. Thermal Reactor Efficiency

The is simply a measure of the effect due to the air injected into the hot exhaust manifold. This is a thermal reaction and is corrected for dilution effect. All data was taken ahead of the catalytic converter.

B. Catalytic Converter Efficiency

This is the effect of the converter oxidizing the CO and HC's. The data was taken simultaneously before and after the converter.

C. Total of Incremental Efficiencies

This is a final cross check of efficiencies A and B above. This data was generated by combining the effects of dilution and incremental efficiencies on the feed gas from prethermal reactor levels to the final tailpipe level. For example, assume a feed gas of 2% CO, dilution of 35%, a thermal conversion of 55%, and a catalytic conversion efficiency of 90%. The effects on the feed gas are:

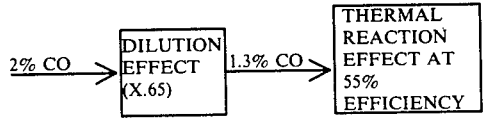

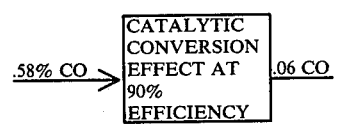

The block diagram indicates that the initial 2% CO level is reduced to 1.3% by the 35% dilution of the air injection system. This is most easily calculated by multiplying by (1−0.35) or 0.65. In a similar manner, the 1.3% CO following dilution is reduced to 0.58% CO by the 55% efficient thermal reaction (multiply by 0.45 which is (1−0.55)). Finally, the 0.58% CO remaining which enters the 90% efficient catalytic converter is reduced to a rounded off value of 0.06% using the same calculation technique. True total conversion efficiency, therefore, is:

$$\frac{1.3\% \ CO - .06\% \ CO}{1.3\% \ CO} \times 100 = 95\%$$

D. Dilution Factor Corrected Efficiency

This data was all taken after the converter using the previously described dilution factor correction/propane injection technique of the present invention.

The following table shows the efficiencies calculated from the data. It is obvious that the dilution factor corrected (D.F.C.) efficiency is a total efficiency check. The "No Converter" data shows a 0% catalytic converter efficiency, whereas the D.F.C. efficiency shows 62%. This apparent efficiency is due to the thermal reaction of the hot exhaust components.

| COMPARATIVE EFFICIENCIES | | | | |
|---|---|---|---|---|
| | Thermal Reactor Efficiency | Catalytic Reactor Efficiency | Total of Incremental Efficiencies | Dilution Factor Corrected Efficiency |
| CO | | | | |
| A. No Converter | 62% | 0% | 62% | 62% |
| B. New Converter | 37% | 93% | 96% | 95% |
| C. Test Converter | 55% | 90% | 95% | 95% |
| HC | | | | |
| A. No Converter | 18% | 0% | 18% | 18% |
| B. New Converter | 38% | 50% | 69% | 69% |
| C. Test Converter | 23% | 17% | 36% | 34% |

The foregoing efficiency testing procedure according to the preferred embodiment uses tailpipe oxygen analysis to establish a dilution factor. By studying the graph of FIG. 2, the effects of the dilution factor at various efficiency levels can be seen. As long as the conversion efficiency is high, 90% and above, the dilution effect between 50% dilution (11% $O_2$) and 0% dilution (1% $O_2$) is actually quite small. At 80% efficiency and ignoring the dilution factor, the tailpipe CO can fall between 0.2% and 0.4%. The graph also shows efficiencies of between 80-90% at 0.2% CO and 60 and 80% at 0.4% CO. At the 1% CO level, efficiencies can fall between 0% and 50%—depending on the dilution factor. Considering this, if oxygen measurement is not used and dilution factors ignored when practicing the present invention, only a very high efficiency pass/fail point will have meaning. CO will have to be at 0.2% or lower to ensure a worst case 80% efficiency. Such an alternate technique is, of course, not recommended except as a last resort.

As previously mentioned, the efficiency testing procedure discussed above is to be conducted on an engine in proper tune and having a properly operating air injector system. The following procedures can be employed to check two of these factors:

AIR INJECTOR SYSTEM TEST PROCEDURE

The purpose of this test is to verify that the air injection system is working properly.

1. Prior to doing this test, verify that the engine is at specified curb idle speed and running smoothly with no misfiring.
2. Disconnect the ported vacuum line from the air injector actuator valve or otherwise disable the air injection system.
3. Adjust the idle mixture screws so that the tailpipe oxygen level is at 1%. This adjustment should be done equally with both mixture screws in order to maintain good side to side balance.
4. Connect a vacuum source to the air injector actuator valve and draw at least a 2" Hg vacuum on the actuator or otherwise enable the air injection system.
5. Read the tailpipe oxygen level and verify it meets factory specifications for the vehicle.
6. If within specifications, re-establish normal connections. Otherwise, take appropriate corrective action.

CARBURETOR SIDE TO SIDE BALANCE PROCEDURE

The purpose of this procedure is to set both idle mixture screws to the proper mixture. The procedure isolates the rich and lean sides of the carburetor and pinpoints where and how much adjustment should be made. This procedure should only be done on an engine that is running smoothly with no misfiring cylinders, and set to factory specifications for curb idle speed and timing.

1. Disable the air injection system such as by disconnecting ported vacuum from the actuator valve controlling the air pump.
2. Read CO and HC emissions and verify engine is running properly.
3. Turn both idle mixture screws to the maximum rich stop of the limiter caps. The tailpipe $O_2$ level should now be less than 1% and stable. If not, go to step 18.
4. Read the oxygen level on the $O_2$ meter.
5. Turn the left barrel mixture screw ½ turn leaner.
6. Read the increase in oxygen when the meter stabilizes.
7. Turn the left barrel mixture screw back to the rich limiter stop.
8. Turn the right barrel mixture screw ½ turn leaner.
9. Read the increase in oxygen when the meter stabilizes.
10. Turn the right barrel mixture screw to the rich limiter stop.
11. The side that had $O_2$ increase the most with a ½ turn of the mixture screw is the leaner side. The other side is the richer side.
12. Turn the rich side mixture screw until the $O_2$ meter reads the same as the lean side indicated when it was ½ turn leaner.
13. Turn the rich side mixture screw back ½ turn richer.
14. The carburetor is now balanced.
15. Turn each mixture screw leaner ¼ turn at a time until the oxygen level in the tailpipe is between 1% to 1½%.
16. If the oxygen reading is unstable, the lean roll point has been reached, and both mixture screws should be turned richer ¼ turn. Continue to equally enrich the mixture until the oxygen meter is stable.
17. Re-enable the air injection system.
18. If the oxygen meter reads more than 1% and is unstable, a vacuum leak may exist. Repair and go back to step 3.

Having thus described my invention, I claim:

1. The method of setting the side to side balance of a carburetor on an engine which is running smoothly with no misfiring cylinders and set to factory specifications for curb idle speed and timing comprising the steps of:
    (a) disabling the air injection means;
    (b) reading the CO and HC emissions and verifying the engine is running properly;
    (c) turning both idle mixture screws to the maximum rich stop of the limiter caps whereupon the tailpipe $O_2$ level should be less than 1% and stable, if not, checking for vacuum leaks;
    (d) reading the oxygen level;
    (e) turning the left barrel mixture screw ½ turn leaner;
    (f) reading the increase in oxygen when stabilized;
    (g) turning the left barrel mixture screw back to the rich limiter stop;
    (h) turning the right barrel mixture screw ½ turn leaner;
    (i) reading the increase in oxygen when stabilized;
    (j) turning the right barrel mixture screw to the rich limiter stop;
    (k) establishing the side that had $O_2$ increase the most with a ½ turn of the mixture screw as the leaner side and the other side as the richer side;
    (l) turning the rich side mixture screw until the $O_2$ level reads the same as the lean side was when it was ½ turn leaner;
    (m) turning the rich side mixture screw back ½ turn richer whereby the carburetor is now balanced;
    (n) turning each mixture screw leaner ¼ turn at a time until the oxygen level in the tailpipe is between 1% to 1½%, if the oxygen reading is unstable, turning both mixture screws richer ¼ turn;
    (o) continuing to equally enrich the mixture until the oxygen meter is stable; and,
    (p) re-enabling the air injection means.

2. The method of setting the balance of a carburetor on an engine which is running smoothly with no misfiring cylinders and set to factory specifications for curb idle speed and timing comprising the steps of:
    (a) disabling the air injection means;
    (b) reading the CO and HC emissions and verifying the engine is running properly;
    (c) turning idle mixture screws to the maximum rich stop of the limiter caps whereupon the tailpipe $O_2$ level should be less than 1% and stable, if not, checking for vacuum leaks;
(d) reading the oxygen level;
(e) turning a first barrel mixture screw ¼ turn leaner;
(f) reading the increase in oxygen when stabilized;
(g) turning said first barrel mixture screw back to the rich limiter stop;
(h) turning a second barrel mixture screw ¼ turn leaner;
(i) reading the increase in oxygen when stabilized;
(j) turning said second barrel mixture screw to the rich limiter stop;
(k) establishing the barrel that had $O_2$ increase the most with a ¼ turn of the mixture screw as the lean barrel and the barrel that had $O_2$ increase the least with a ¼ turn of the mixture screw as the rich barrel;
(l) turning the rich barrel mixture screw until the $O_2$ level reads the same as the lean barrel was when it was ¼ turn leaner;
(m) turning the rich barrel mixture screw back ¼ turn richer whereby the carburetor is now balanced;
(n) turning each mixture screw leaner ¼ turn at a time until the oxygen level in the tailpipe is between 1% to 1½%, if the oxygen reading is unstable, turning all mixture screws richer ¼ turn;
(o) continuing to equally enrich the mixture until the oxygen meter is stable; and,
(p) re-enabling the air injection means.

* * * * *